US007322188B2

(12) United States Patent
Cline et al.

(10) Patent No.: US 7,322,188 B2
(45) Date of Patent: Jan. 29, 2008

(54) ANTI-CONDENSATION CONTROL SYSTEM FOR DEVICE DRIVEN BY COMPRESSED AIR

(76) Inventors: William A. Cline, 5763 Clearview, Troy, MI (US) 48098; Michael R. Bonner, 2320 Pleasant View Dr., Rochester, MI (US) 48306

( * ) Notice: Subject to any disclaimer, the term of this patent is extended or adjusted under 35 U.S.C. 154(b) by 80 days.

(21) Appl. No.: 10/536,765

(22) PCT Filed: Nov. 26, 2003

(86) PCT No.: PCT/US03/37846

§ 371 (c)(1),
(2), (4) Date: Apr. 17, 2006

(87) PCT Pub. No.: WO2004/049085

PCT Pub. Date: Jun. 10, 2004

(65) Prior Publication Data

US 2006/0225413 A1 Oct. 12, 2006

Related U.S. Application Data

(60) Provisional application No. 60/428,990, filed on Nov. 26, 2002.

(51) Int. Cl.
*B05B 7/16* (2006.01)
*F24H 3/02* (2006.01)

(52) U.S. Cl. ........................................ 60/407; 239/135

(58) Field of Classification Search .................. 60/407
See application file for complete search history.

(56) References Cited

U.S. PATENT DOCUMENTS 2,980,339 A * 4/1961 Hendrik et al. ............. 239/135
3,336,463 A * 8/1967 Johnson ...................... 239/135
5,214,740 A * 5/1993 Carroll ....................... 239/135

* cited by examiner

*Primary Examiner*—Thomas E. Lazo
(74) *Attorney, Agent, or Firm*—Young Basile PC

(57) ABSTRACT

An anti-condensation control system for devices driven by or utilizing decompressing air is provided. The system includes a supply of compressed air connected to a compressed air-utilizing device. A source of heated fluid is provided and is connected to a heat exchanger that transfers heat from the heated fluid to the compressed air. The compressed air is heated in the heat exchanger sufficiently that upon decompression the temperature of the device is not lowered to the ambient dew point. The system is particularly applicable to devices utilizing compressed air for the spraying of liquid materials.

23 Claims, 1 Drawing Sheet

ANTI-CONDENSATION CONTROL SYSTEM FOR DEVICE DRIVEN BY COMPRESSED AIR

This Application Claims the Benefit of the Filing Date of U.S. Provisional Application Ser. No. 60/428,990, Filed Nov. 26, 2002

TECHNICAL FIELD

The present invention relates generally to compressed air-driven devices, and more particularly to such a device in combination with an anti-condensation system.

BACKGROUND OF THE INVENTION

Various work environments present explosion risks associated with the utilized materials and operating conditions. Paint spraying and other mixing and chemical operations can produce flammable fumes and other suspended flammable material, creating particular hazards in this regard. In response to these safety concerns, it is often preferable to utilize compressed air to drive mechanical devices in such environments, for example, rotary disk sprayers for paint atomization, rather than using electrically driven devices which can spark and cause an explosion. The compressed air used to drive such devices decompresses and expands as it performs the desired work, transferring kinetic energy to the driven device. However, depressurization of the compressed air to ambient (typically atmospheric) pressure allows a substantial increase in volume as the air exits the pressurized system, and a concomitant drop in the temperature of the air. As the air cools, it can absorb heat energy from the ambient surroundings. In many cases, the air absorbs a substantial amount of heat from the air-driven component and the surrounding housing, reducing their temperatures below the ambient dew point, which causes water condensation on the equipment Where the change in pressure is sufficient, the temperature of the equipment may be reduced enough to actually freeze the condensed water.

Condensation causes a variety of problems that are preferably avoided. Condensation may speed corrosion of the equipment, adversely affecting the life expectancy of expensive equipment and adversely affecting its accuracy or efficiency. Worse, corrosion can disrupt the integrity of the process, or require process downtime to allow water or even ice to be removed from the equipment.

For example, in high-speed, high-quality paint processes, such as in the paint booths utilized by many automobile manufacturers, a single drop of water can ruin a paint job on an automobile. Existing designs have attempted to overcome the condensation issue by heating the compressed air remote from the workspace so that when it decompresses, the air does not cool to the ambient dew point. However, because of the low thermal capacity of air, such systems have met with only limited success. The heating element in such systems is typically electrical and must be kept remote from the air-driven device. Since air loses its thermal energy rapidly to ambient conditions, any distance the air travels beyond a few inches results in greatly reduced compressed air temperature, and thus a significant reduction in the efficacy of heating the air.

SUMMARY OF THE INVENTION

The present invention provides a non-hazardous heating system for compressed air proximate a point at which the air decompresses and drives equipment. The present invention can also pertain to compressed air delivery systems, such as compressed air paint delivery systems.

In one aspect, the present invention includes an apparatus for reducing condensation in a pressurized air-driven device or air pump. The apparatus comprises a source of heated fluid, a compressed air delivery apparatus, at least one device at which air is decompressed, and a fluid delivery apparatus for supplying said heated fluid to said compressed air delivery apparatus proximate the point at which the air decompresses.

In another aspect, the present invention includes a method of controlling condensation in a pressurized air-driven or air delivery device. The method includes the step of supplying heated fluid to a compressed air delivery apparatus to raise the temperature of the air prior to decompressing the air to perform work.

DETAILED DESCRIPTION

Figure 1:
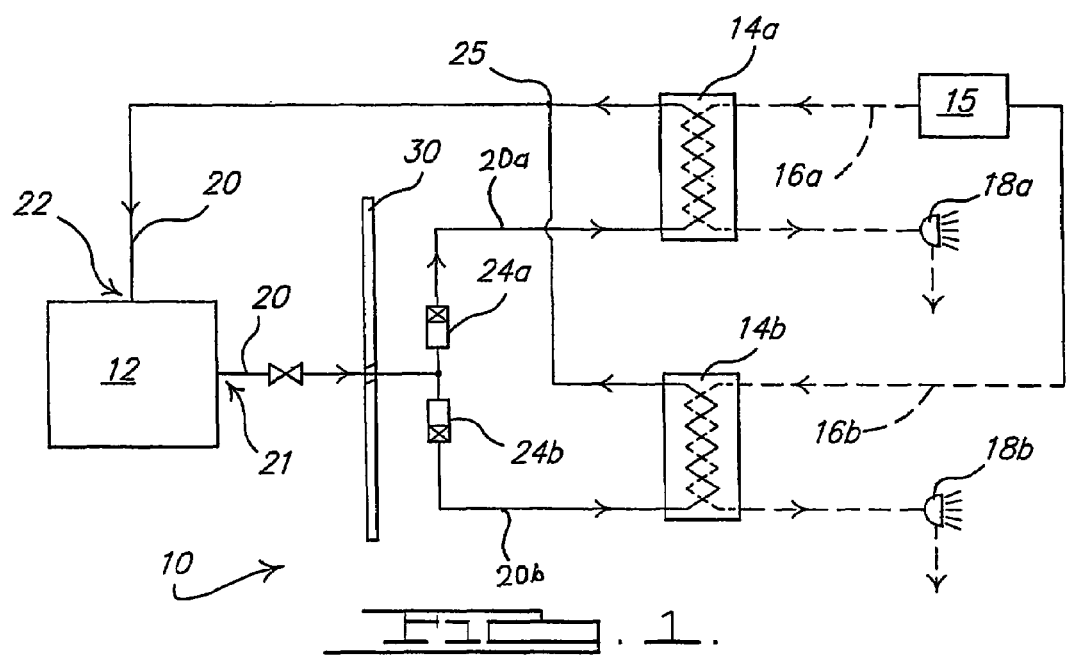
FIG. 1 is a system level schematic diagram of a spray apparatus according to a first preferred embodiment of the present invention.

Referring to FIG. 1, there is shown an apparatus 10 for eliminating/minimizing water condensation in an air pump or compressed air-driven spray apparatus according to a preferred embodiment of the present invention. Apparatus 10 eliminates/reduces water condensation in a compressed air system by heating the compressed air prior to decompression. The air is preferably heated to a level sufficient that, upon the decompression necessary to perform work, the inherent temperature drop of the air as it expands does not lower the air temperature past or significantly below the ambient temperature. Thus, the resulting air temperature will not significantly lower the temperature of surrounding materials, e.g. air-driven device housings and other nearby physical objects. In particular, the temperature of the driven device, e.g. a paint sprayer, will not drop below the dew point of the ambient air. Because air has a relatively low thermal capacity, the heating preferably takes place as close as practicable to the point at which the air is released from its compressed condition. It should be appreciated that apparatus 10 is merely illustrative, and the following description should not be construed to limit the scope of the present invention in any fashion. All the components of the present invention are manufactured from known materials and by known processes.

Apparatus 10 preferably includes a source of heated fluid 12, and at least one heat exchanger, preferably a plurality of heat exchangers 14a and 14b. Heat exchangers 14a and 14b are preferably conventional heat exchangers wherein lines carrying heated fluid 20a and 20b and one or more lines carrying compressed air 16a and 16b are in intimate physical association therein. As used herein, the term "heat exchanger" should be broadly construed, and any suitable means for heating the compressed air supply could be used without departing from the scope of the present invention. Heat exchangers 14a and 14b may be positioned in series or parallel with the compressed air supply line(s).

A variety of different means for heating fluid in supply 12 could be utilized without departing from the scope of the present invention. Fluid supply 12 may be a conventional electric or gas heater, or it might be a modular water heating and re-circulating unit, well known in the art and readily available. Apparatus 10 also includes at least one compressed air supply 15 that supplies compressed air to at least one compressed air-driven device, preferably two such devices 18a and 18b, or to an air pump (not shown). The fluid utilized is preferably water; however, alternative fluids such as antifreeze, oils, etc. might be used. Those skilled in the art will appreciate that suitable heat transfer fluids must have a sufficient thermal capacity. Sufficient thermal capacity exists where the heated fluid has enough heat upon reaching heat exchangers 18a and 18b that it will warm the compressed air to a level sufficient that, during expansion, the air does not cause significant condensation in the compressed air-driven device or air pump outlet Most preferably, no condensation will form on the compressed air-driven device or pump outlet. Those skilled in the art will appreciate that the amount of heat that must be transferred to the compressed air via heat exchangers 18a and 18b will vary depending on such factors as the ambient temperature, humidity, content of the gas, volume of the gas flowing through the circuit, and the function performed by the gas.

For example, where relative humidity varies within a production or treatment facility, the ambient dew point may vary accordingly. In such a scenario, the temperature of the air can be varied to ensure that condensation will not form on the driven components and associated hardware. Similarly, the temperature of the air does not necessarily need to be heated substantially above a temperature necessary to avoid condensation upon decompression. Therefore it may in some instances be desirable, during relatively low humidity or high temperature ambient conditions, to avoid wasting energy through unnecessary heating of the air.

It is contemplated that two principle means for adjusting the degree of heating of the air may be employed. In a first embodiment, the flow rate of heated fluid from source 12 to heat exchangers 14a and 14b can be increased or decreased. This can be achieved via flow control valves, described below, or by varying the pumping rate of heated fluid source 12. Alternatively, the temperature of heated fluid supplied from source 12 can be adjusted, increasing or decreasing the degree of heating of the compressed air. In one preferred embodiment (not shown), the temperature of the compressed air is monitored by a temperature sensor on or in the air supply lines 16a and 16b. In an alternative embodiment (also not shown), the air temperature can be approximated by utilizing a temperature sensor placed on or in the fluid supply line 20 or heat exchangers 14a and 14b.

Figure 2:
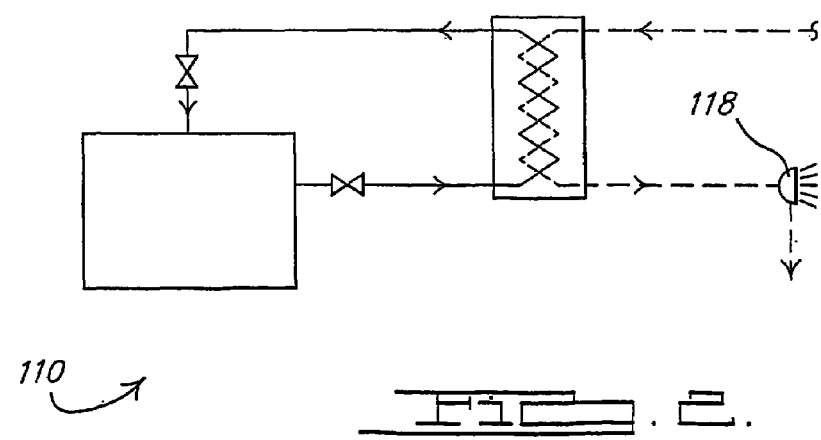
FIG. 2 is a system level schematic diagram of a spray apparatus according to a second preferred embodiment of the present invention.

Each of the heat exchangers 14a and 14b preferably transfers heat to a compressed air supply line 16a, 16b. In a preferred embodiment, the heat exchangers 14a and 14b should be located as close as is practicable to devices 18a and 18b, to minimize heat loss from the compressed air prior to decompression. The heated, compressed air is supplied via lines 16a and 16b to compressed air-driven devices 18a and 18b. In a preferred embodiment, devices 18a and 18b are compressed air-driven rotary disk painting devices located in conventional painting bell housings, however, the present invention is not thereby limited. For example, the presently disclosed method and apparatus could be used in conjunction with industrial air compressors, used in environments where condensation proximate the point of air expansion, e.g. the air nozzle, is undesirable. It should be appreciated that while the presently described embodiment includes two heat exchangers and two compressed air-driven devices, a system might be designed having a single heat exchanger or a single compressed air-driven device, or many such exchangers or devices without departing from the scope of the present invention. FIG. 2 illustrates an apparatus 110 according to the present invention having a single compressed air-driven device 118.

In the FIG. 1 embodiment, fluid supply 12 is connected to a fluid supply circuit 20, which includes a fluid outlet 21 through which fluid is supplied to the heat exchangers 14a and 14b, and preferably includes a fluid inlet 22 that receives recirculated fluid. Heated fluid may be driven through circuit 20 by any suitable means, including incident water pressure or, alternatively, a pump (not shown). The temperature to which the fluid is heated can vary, and the optimum temperature at source 12 will vary, depending on the temperature to which the compressed air must be heated, and the amount of heat lost by the fluid before entering the heat exchangers. The quantity of lost or radiated heat is related to the distance that the fluid must flow, and the types of tubing, bulkheads, control valves, insulation, etc. that are utilized. In a preferred embodiment, water is heated in source 12 from the supply temperature to approximately 130° F., then pumped to the heat exchanger.

As described herein, the temperature to which the compressed air should be heated depends on a number of factors, including the relative humidity of the ambient air, which determines the dew point, the ambient temperature, and the amount of heat that will be lost prior to delivering the compressed air to the compressed air-driven device. Similar to the heated fluid, heat loss from the compressed air is a function of the types of tubing and other materials the compressed air flows through, its pressure, air volume, etc. In a preferred embodiment, in which apparatus 10 is in cooperation with a rotary painting device, the compressed air is heated by the 130° F. fluid to approximately 125° F., and cools to approximately 76° F. upon decompression. A set of adjustable flow setters 24a and 24b are preferably located in the fluid circuit upstream of each of the heat exchangers 14a and 14b, allowing fluid flow to the two heat exchangers 14a and 14b to be monitored and independently adjusted as desired.

Upon exiting the heat exchangers 14a and 14b, the fluid lines preferably converge at a junction 25, after which the fluid returns to supply 12 for reuse. In yet another embodiment (not shown), rather than a conventional heat exchanger, the fluid supply line and the compressed air supply line are coaxial, allowing the compressed air line to be continually heated by a fluid bath over the course of the air's travel to the device or pump. In a preferred embodiment, the present invention is practiced primarily within a "paint booth," or mix room, comprising a barrier 30 that is placed between the heat (fluid) source 12 and the compressed air-driven devices 18a and 18b, isolating the heat source electrically, and in some applications, fluidly, from the booth to reduce the risk of explosion.

The present invention thus provides a system wherein the compressed air is heated shortly before being decompressed to perform work. By sufficiently raising the temperature of the compressed air prior to exhausting to ambient, the temperature of the air does not decrease to the freezing point or even the dew point of the surroundings. The temperature of the device is thereby maintained at a temperature sufficient to avoid condensation from ambient air. Apparatus 10 is particularly well suited to environments in which the use of conventional heat sources in close proximity to the work area is undesirable. The relatively high thermal capacity of water allows the heated water to be pumped a substantial distance through conventional water lines/hoses without radiating a significant quantity of heat. Because water poses no significant risk of inducing a fire or explosion (and in fact often reduces the risk), the present invention provides significant advantages over other designs in which expensive and unwieldy explosion-proof heaters are used in close proximity with the workspace, as well as designs where the compressed air is heated remote from the point of decompression.

The present description is for illustrative purposes only, and should not be construed to limit the breadth of the present invention in any way. Thus, those skilled in the art will appreciate that various modifications might be made to the presently disclosed embodiments without departing from the intended spirit and scope of the present invention. Other aspects, features and advantages will be apparent upon an examination of the attached drawing Figures and appended claims.

The invention claimed is:

1. An apparatus for driving a device with compressed air comprising:
   a compressed air source;
   a device operable with air supplied from said source via a compressed air supply line;
   a heated fluid source for providing a heated fluid proximate the at least one device via a heated fluid supply line;
   a heat exchanger connected to the compressed air supply line and the heated fluid supply line;
   wherein the heat exchanger transfers heat energy from the heated fluid to the compressed air, thereby elevating the temperature of the air sufficiently that upon decompression and driving of the device the temperature of the air remains higher than an ambient dew point.

2. The apparatus of claim 1 wherein the heated fluid source supplies water that is at least about 130° F.

3. The apparatus of claim 2 wherein upon passing through the heat exchanger the temperature of the air is increased up to about 125° F. and wherein upon decompression the temperature of the air drops to no lower than about 76° F.

4. The apparatus of claim 3 wherein upon passing through the heat exchanger the temperature of the air is increased to about 125° F. and upon decompression the temperature of the air drops to about 76° F.

5. The apparatus of claim 1 further comprising a flow control valve positioned in the fluid supply line and operable to adjust a fluid flow rate therethrough.

6. The apparatus of claim 5 further comprising a temperature sensor operable to indicate an approximate temperature of air after passing through the heat exchanger.

7. The apparatus of claim 1 wherein the heat exchanger comprises coaxial portions of the compressed air supply line and the heated fluid supply line.

8. The apparatus of claim 1 further comprising a barrier substantially fluidly and electrically isolating the compressed air driven device from the heated fluid source.

9. A system for the application of liquid materials to a substrate comprising:
   a compressed air source;
   an application booth;
   a rotary device positioned in the application booth for atomizing and spraying a liquid material, wherein the rotary device is driven by decompressing air supplied from the compressed air source;
   a heated fluid source;
   a heat exchanger for heating the compressed air prior to driving the rotary device by transferring heat thereto from fluid supplied by the heated fluid source;
   wherein the heat exchanger is positioned sufficiently proximate the rotary device such that air heated thereby does not upon decompression fall to a dew point temperature.

10. The system of claim 9 wherein the application booth is electrically isolated from the heated fluid source.

11. The system of claim 9 further comprising a plurality of rotary devices driven by decompressing air supplied from the compressed air source.

12. The system of claim 11 further comprising a plurality of heat exchangers, each said heat exchanger being mounted proximate one of said plurality of rotary devices.

13. The system of claim 12 further comprising:
   a plurality of application booths;
   a plurality of parallel arranged heated fluid supply lines, each of said supply lines being connected to one of said plurality of heat exchangers;
   wherein each of said heat exchangers provides heated compressed air to one of said plurality of application booths.

14. The system of claim 9 wherein the liquid material supplied to the rotary device comprises a paint, and wherein the rotary device comprises a rotatable atomization disk driven by decompressing air, the rotary device being mounted in a painting bell.

15. A method of controlling condensation in a liquid spraying apparatus comprising the steps of:
   connecting a compressed air supply line with a device at which air is decompressed;
   connecting the compressed air supply line to a heat exchanger and passing compressed air therethrough;
   connecting a supply line carrying heated fluid to the heat exchanger such that the heated fluid can elevate the temperature of the compressed air in the heat exchanger;
   supplying the compressed air passed through the heat exchanger to the device at a temperature sufficient that upon decompression the air does not cool the device to an ambient dew point.

16. The method of claim 15 wherein the heat exchanger is positioned sufficiently proximate the device that the compressed air passed therethrough arrives at the device at a sufficiently elevated temperature such that upon decompression the air does not cool the device to an ambient dew point.

17. The method of claim 15 wherein the heat exchanger is supplied with heated fluid at a temperature sufficient that the compressed air passed therethrough arrives at the device at a sufficiently elevated temperature such that upon decompression the air does not cool the device to an ambient dew point.

18. The method of claim 15 wherein the step of connecting a supply line to the heat exchanger comprises connecting a supply line carrying fluid that is at least about 130° F.

19. The method of claim 18 wherein the compressed air is heated to about 125° F. in the heat exchanger.

20. The method of claim 19 wherein the step of supplying the air to the device comprises supplying air heated in the heat exchanger sufficiently that upon decompression the temperature of the air drops to no lower than about 76° F.

21. The method of claim 15 further comprising the steps of:
   monitoring the approximate temperature of air supplied to the device; and
   adjusting the flow rate of the heated fluid to the heat exchanger to provide for heating of the air sufficiently that upon decompression the air does not cool the device to an ambient dew point.

22. The method of claim 21 wherein the step of monitoring the temperature of air supplied to the device comprises monitoring the temperature of fluid supplied to the heat exchanger.

23. The method of claim 15 further comprising the steps of:
   monitoring the approximate temperature of air supplied to the device; and
   adjusting the temperature of the heated fluid supplied to the heat exchanger to provide for heating of the air sufficiently that upon decompression the air does not cool the device to an ambient dew point.

* * * * *